United States Patent [19]
Teng et al.

[11] Patent Number: 5,285,280
[45] Date of Patent: Feb. 8, 1994

[54] DIVISION METHOD AND SYSTEM FOR GHOST CANCELLATION

[75] Inventors: Chich-Yeuan Teng, Tainan; Ching-Shyang Lo, Taipei, both of Taiwan

[73] Assignee: Industrial Technology Research Institute, Hsinchu, Taiwan

[21] Appl. No.: 33,400

[22] Filed: Mar. 19, 1993

[51] Int. Cl.$^5$ .............................................. H04N 5/21
[52] U.S. Cl. ................................................ 368/614
[58] Field of Search ................ 358/36, 37, 166, 167, 358/905; H04N 5/21

[56] References Cited

U.S. PATENT DOCUMENTS

| | | | |
|---|---|---|---|
| 4,947,252 | 8/1990 | Kobayashi et al. | 358/167 |
| 4,953,026 | 8/1990 | Kobayashi et al. | 358/167 |
| 5,119,196 | 6/1992 | Ayandglu et al. | 358/167 |
| 5,138,453 | 8/1992 | Kobayashi et al. | 358/905 X |
| 5,170,260 | 12/1992 | Tabata | 358/167 |
| 5,179,444 | 1/1993 | Koo | 358/905 X |
| 5,184,221 | 2/1993 | Nishi et al. | 358/167 |
| 5,196,396 | 3/1993 | Kobayashi et al. | 358/167 |

Primary Examiner—Mark R. Powell
Attorney, Agent, or Firm—Meltzer, Lippe, Goldstein et al.

[57] ABSTRACT

A system and process are disclosed for cancelling ghosts in a sampled, received video signal. An extraction circuit extracts a received ghost cancelling reference signal from a received video signal transmitted through a multipath channel. The received ghost cancelling reference signal and an ideal ghost cancelling reference signal are inputted to a digital signal processor. Therein, the digital signal processor computes a nearby ghost tap coefficient signal by dividing the autocorrelation of an ideal GCR signal by the cross-correlation of the ideal and received GCR signals. A band of this tap coefficient signal above the upper cutoff frequency of the received video signal is filled with a constant, non-zero value. The sampled, received video signal is then filtered in a transversal filter with the filled tap coefficient signal.

18 Claims, 6 Drawing Sheets

DIVISION METHOD AND SYSTEM FOR GHOST CANCELLATION

RELATED CASE

U.S. patent application Ser. No. 08/033,774, entitled "Ghost Cancelle with Variable Delay Selector" has been filed on an even date herewith and is assigned to the assignee of the present application. The above application contains subject matter related to the subject matter of the present application and is incorporated herein by reference.

FIELD OF THE INVENTION

The present invention relates to filtering video signals. More particularly, the present invention relates to cancelling ghosts, or extraneous duplicate signals, from a video signal transmitted via a multipath channel.

BACKGROUND OF THE INVENTION

FIG. 1(a) depicts a multipath channel through which television signals propagate from a transmitter 1 to a receiver 2. As depicted, the television signals arrive at the receiver 2 via a number of paths A, B, C, D including a short direct path A, and longer paths B, C, D in which the signals reflect off of features of the channel (e.g., buildings, mountains, and the ionosphere). All of these signals are superimposed at the receiver 2. The signals arriving via the paths B-D are weaker than the signal arriving via the direct path A. Thus, the signal arriving via the path A produces the strongest video image at the receiver 2 and is referred to as the "main" signal. Furthermore, the signals arriving via the paths B-D are delayed with respect to the main signal arriving via the path A. As a result, the signals arriving via the paths B-D produce delayed duplicate video images or "post-ghosts" of the main signal arriving via the path A as depicted in FIG. 1(b).

Another multipath channel is depicted in FIG. 1(c). As depicted, a signal arrives via a short path E through buildings 3. A signal also arrives via a longer reflection path F and is thus delayed with respect to the signal arriving via the short path E. In this case, it is assumed that the signal arriving via path E is attenuated to a greater extent (by virtue of propagating through the buildings 3) than the signal arriving via the path F. In such a case, the weaker signal arriving via the path E produces a "pre-ghost" of the main signal arriving via the path F as depicted in FIG. 1(d).

It is desirable to eliminate both pre-ghosts and post-ghosts of the main signal in order to improve reception. Several ghost cancelling systems have been proposed in the form of a channel equalizer. FIG. 2(a) depicts a transmission path including a transmitter 4, a multipath channel 5 and a receiver 6 which includes a channel equalizer 7 and a display device 8. In such systems, an ideal ghost cancelling reference (GCR) signal $R_{ideal}(t)$ is inserted into the video signal V(t), e.g., during the vertical blanking interval, prior to transmission from the transmitter 4. The transmitter 4 transmits the video signal V(t) (including the ideal GCR signal $R_{ideal}(t)$) which propagates through the multipath channel 5 having an impulse response A(t). By virtue of propagating through the multipath channel 5, a signal with ghosts V(t)*A(t) (including $R_{ideal}(t)$*A(t)) is produced, where "*" means "convolved with." This signal V(t)*A(t) is received at the receiver 6 where it is inputted to the channel equalizer 7. The channel equalizer 7 has an impulse response W(t) and therefore outputs the signal V(t)*A(t)*W(t). The channel equalizer 7 is designed so that V(t)*A(t)*W(t)=V(t). The signal outputted from the channel equalizer 7 is then displayed on a display device such as a cathode ray tube (CRT) screen 8.

The channel equalizer 7 is shown in greater detail in FIG. 2(b). As depicted in FIG. 2(b), the channel equalizer 7 typically includes an analog to digital converter (ADC) 9 which converts the received video signal V(t)*A(t) to digital form. Illustratively, the received video signal V(t)*A(t) has an upper cutoff frequency of approximately 4.2 MHz. The received video signal V(t)*A(t) is illustratively sampled in the ADC 9 at 14.32 MHz. These samples are inputted to an extraction circuit 10 which extracts the received GCR signal $R_{rec}(t)$ (where $R_{rec}(t)=R_{ideal}(t)*A(t)$) from the received video signal V(t)*A(t). This received GCR signal $R_{rec}(t)$ may be temporarily stored in a RAM 11. The received GCR signal $R_{rec}(t)$ is then compared to an ideal GCR signal $R_{ideal}(t)$ (obtained from a circuit 12, such as a ROM) in a CPU or digital signal processor (DSP) 13. Based on the discrepancy between the received $R_{rec}(t)$ and the ideal $R_{ideal}(t)$ GCR signals, the CPU or DSP 13 generates filtering or tap coefficients for cancelling ghosts in the received video signal V(t)*A(t). The tap coefficients are transferred to a transversal filter 14. The received video signal V(t)*A(t) is accordingly digitally filtered by the transversal filter 14 using the tap coefficients determined by the CpU or DSp 13. The filtered video signal outputted by the transversal filter 14 may illustratively be converted back to analog form in a digital to analog converter (DAC) 15.

FIG. 2(c) shows an exemplary prior art transversal filter 14 including a finite impulse response filter (FIR) 16, and an infinite impulse response filter (IIR) 17. Illustratively, the IIR filter 17 is formed by connecting a second FIR filter 18 in negative a feedback path of an adder 19 to which the FIR filter 16 is connected. U.S. Pat. No. 4,953,026 discloses conventional circuits for implementing a FIR or IIR filter.

Several conventional algorithms have been proposed for obtaining FIR and IIR tap coefficients (see U.S. Pat. No. 4,947,252). Tap coefficients of the transversal filter 14 (FIG 2(c)) within the channel equalizer 7 (FIG. 2(a)) may be derived from the formula V(t)*A(t)*W(t)=V(t). According to one conventional method, called a division method, the tap coefficients are determined so that $$W(f) = \frac{V(f)}{V(f) \cdot A(f)} \quad (1)$$

where V(f), A(f) and W(f) are the video signal, the channel impulse response and the equalizer impulse response, in the frequency domain, respectively. The video signal V(f) and the channel impulse response A(f) are both unknown and vary over time. If, however, a known ghost cancelling reference (GCR) signal $R_{ideal}(t)$ is inserted into the video signal V(t) prior to transmission, then the tap coefficients may be generated by comparing the received and ideal GCR signals $R_{rec}(t)$ and $R_{ideal}(t)$ In such a case, the above formula may be simplified to:

$$W(f) = \frac{R_{ideal}(f)}{R_{ideal}(f) \cdot A(f)} \quad (2)$$

FIG. 3 depicts one conventional division method algorithm for obtaining tap coefficients. Typically, the FIR filter 16 utilizes a relatively small number of taps for cancelling "nearby" ghosts (e.g., a ghost separated by 2 μsec from the main signal). To determine nearby ghost tap coefficients according to this method, the signal $R_{rec}(t)$ is first windowed over a short interval appropriate for cancelling nearby ghosts to produce the signal $R_{rec}'(t)$ in step 40 (herein, one prime mark indicates short term windowing). Next, in step 42, the signal $R_{rec}'(t)$ is fourier transformed to produce the signal $R_{rec}'(f)$ Then, in step 44, the nearby ghost tap coefficient signal $W_{near}(f)$ is determined by the formula $$W_{near}(f) = \frac{R_{ideal}(f)}{R_{rec}'(f)} \quad (3)$$

As depicted in FIG. 4, $W_{near}(f)$ is plotted from zero to half the sampling frequency $f_{s/2}$ (where $f_s$ is the sampling frequency, e.g., 14.32 MHz). As the signal is symmetric about $f_{s/2}$, the discussion herein considers only the frequency band below $f_{s/2}$. As depicted, $W_{near}(f)$ has a large noise component above the upper cutoff frequency $f_v$ of the received video signal $V(t)*A(t)$ (e.g., 4.2 MHz). At certain frequencies, this noise component exceeds the value one (indicated by a dashed line). As such, the signal $W_{near}(f)$ is often subsequently compensated to zero above $f_v$, i.e., above 4.2 MHz, in the frequency domain, by dividing the tap coefficient signal $W_{near}(f)$ by another signal. The signal $W_{near}(f)$ after compensation is depicted in FIG. 5. As depicted, the compensated signal $W_{near}(f)$ resembles the impulse response of a low pass filter.

Returning now to FIG. 3, in step 46, this signal $W_{near}(f)$ is converted to the time domain by computing its inverse fourier transform. Finally, in step 48, the signal $W_{near}(t)$ is windowed over a short interval (appropriate for producing nearby ghost tap coefficients) to produce the signal $W_{near}'(t)$.

The windowed nearby ghost tap coefficient signal $W_{near}'(t)$ is depicted in FIG. 6. As depicted, the signal $W_{near}'(t)$ has a main peak centered approximately at the time interval of a ghost. The signal $W_{near}'(t)$, however, is spread out over the time domain having other maxima and minima where no ghost exists.

The prior art division method of FIG. 3 also produces tap coefficients for the IIR filter 17. The IIR filter 17 typically has a large number of tap coefficients for cancelling "non-nearby" or "normal" ghosts (e.g., a ghost separated by 40 μsec from the main signal).

In step 50, the received GCR signal $R_{rec}(t)$ is windowed appropriately for cancelling normal ghosts to produce the signal $R_{rec}''(t)$ (herein, two prime marks means long term windowing). Next, in step 52, the signal $R_{rec}''(t)$ is fourier transformed to produce the signal $R_{rec}''(f)$. In step 54, the windowed nearby tap coefficient signal $W_{near}'(t)$ (obtained in step 48) is fourier transformed to produce the signal $W_{near}'(f)$. These two signals $R_{rec}''(f)$ and $W_{near}'(f)$ are used to form the signal h(f) in step 56. h(f) is determined by the formula:

$$h(f) = R_{ideal}(f) - R_{rec}''(f) \cdot W_{near}'(f) \quad (4)$$

Then in step 58, the normal ghost tap coefficient signal $W_{norm}(f)$ is determined by the formula:

$$W_{norm}(f) = \frac{h(f)}{R_{ideal}(f)} \quad (5)$$

In step 60, the inverse fourier transform of $W_{norm}(f)$ is computed to produce the signal $W_{norm}(t)$ Finally, $W_{norm}(t)$ is windowed over a long interval (appropriate for producing normal ghost tap coefficients) to produce the signal $W_{norm}''(t)$ in step 62.

This prior art division method for generating tap coefficients has disadvantages. When compensated to zero, the tap coefficient signal in the frequency domain $W_{near}(f)$ resembles the impulse response of a low pass filter. As such, when converted to the time domain, the tap coefficient signal $W_{near}'(t)$ spreads out over the time domain having minima and maxima where no ghosts are located. Because the tap coefficient signal $W_{near}'(t)$ is spread out over the time domain, a greater number of tap coefficients are required to filter adequately a video signal.

It is an object of the present invention to overcome the disadvantages of the prior art division method.

SUMMARY OF THE INVENTION

This and other objects are achieved by the present invention which provides a division method and system for cancelling ghosts within a video signal received from a multipath channel. According to the invention, nearby ghost cancelling tap coefficients $W_{near}(f)$ are determined by the formula:

$$W_{near}(f) = \frac{R_{auto}(f)}{R_{cross}'(f)} \quad (6)$$

where $R_{auto}(f)$ is the autocorrelation of an ideal ghost cancelling reference (GCR) signal $R_{ideal}(t)$, and $R_{cross}(f)$ is the cross-correlation of the ideal GCR signal $R_{ideal}(t)$ and a received GCR signal $R_{rec}(t)$ which is extracted from the received video signal. Thereafter, a band of the nearby ghost tap coefficient signal $W_{near}(f)$ above the upper cutoff frequency $f_v$ (e.g., from $f_v$ to $f_s-f_v$) of the received video signal is filed with a constant non-zero value, such as the average value of the signal $W_{near}(f)$ below the cutoff frequency $f_v$.

Normal or non-nearby ghost taps $W_{norm}(f)$ may be determined by the formula $$W_{norm}(f) = \frac{H(f)}{R_{auto}(f)} \quad (7)$$

where $$H(f) = R_{auto}(f) - R_{cross}''(f) \cdot W_{near}'(f) \quad (8)$$

A band of this signal $W_{norm}(f)$ above the upper cutoff frequency of the received video signal may also be filled with a constant non-zero value.

Tap coefficients determined according to the above process are concentrated over a relatively short time interval centered about a ghost in the received video signal. As such, fewer tap coefficients are necessary for adequately cancelling ghosts.

DETAILED DESCRIPTION OF THE INVENTION

Figure 7:
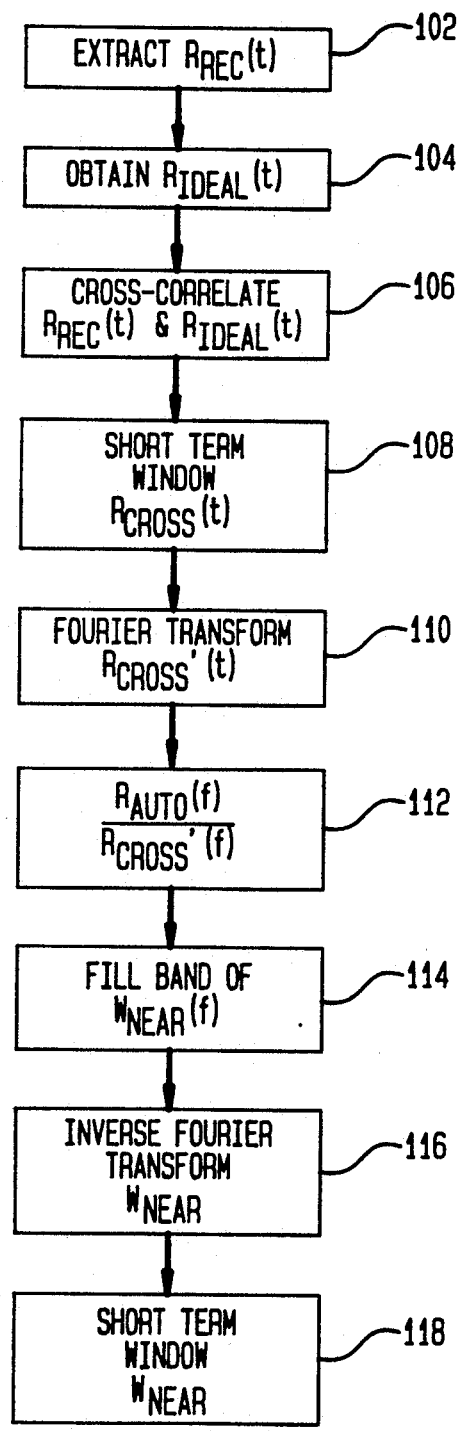
FIG. 7 schematically illustrates a process according to the present invention for generating a nearby ghost tap coefficient signal.

A process for dynamically generating the nearby ghost tap coefficients according to the present invention is now discussed in greater detail with reference to FIG. 7. As mentioned above, when the video signal $V(t)*A(t)$ is received, it is sampled in the ADC 9 (FIG. 2(b)). Illustratively, the received video signal $V(t)*A(t)$ has a bandwidth of approximately 4.2 MHz and is sampled at 14.32 MHz. The received GCR signal $R_{rec}(t)$ is then extracted from the sampled video signal (in, for example, the extraction circuit 10 of FIG 2(b)) as depicted in step 102. Illustratively, this received GCR signal $R_{rec}(t)$ is stored in the RAM 11 (FIG. 2(b)). As depicted in step 104, an ideal GCR signal $R_{ideal}(t)$ is also generated at, or retrieved from, the circuit 12 (FIG. 2(b)). Illustratively, the circuit 12 (FIG. 2(b)) comprises a ROM for storing the ideal GCR signal $R_{ideal}(t)$.

Figure 1A:
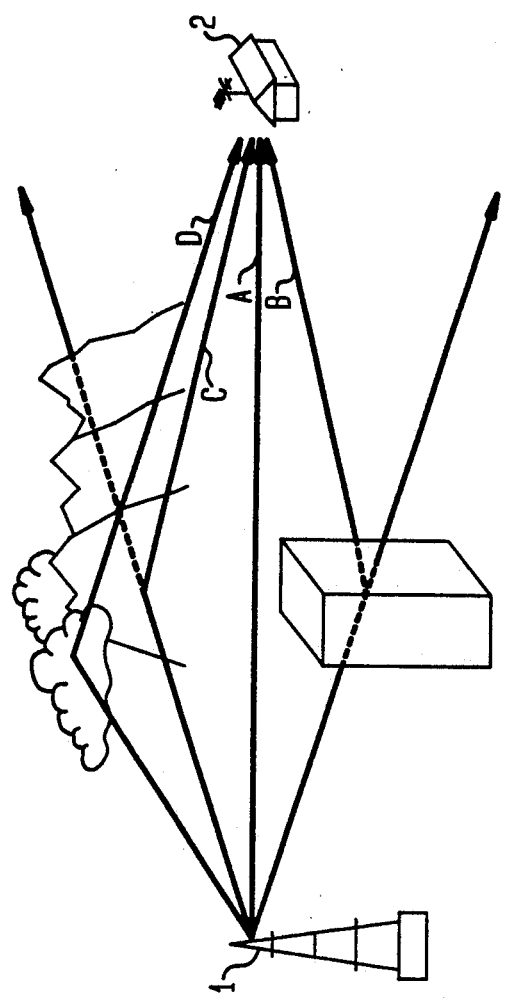
FIGS. 1(a),(b) illustrate a multipath channel and a post-ghost formed by that channel, respectively.
Figure 1C:
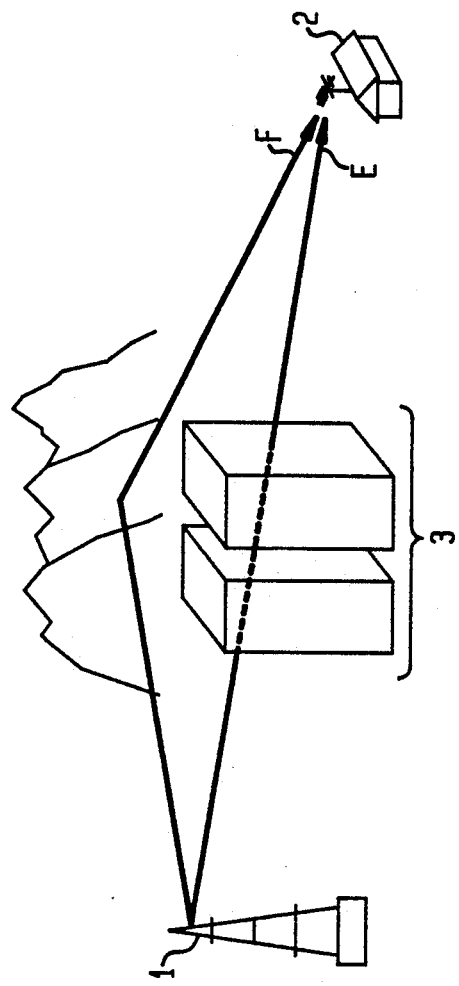
FIGS. 1(c),(d) illustrate a second multipath channel and a pre-ghost formed by that channel, respectively.
Figure 1B:
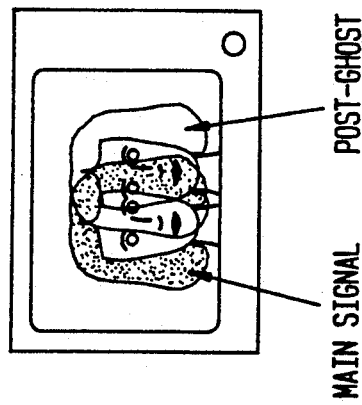
Figure 1D:
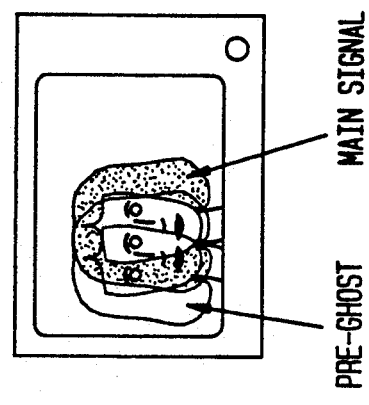
Figure 2:
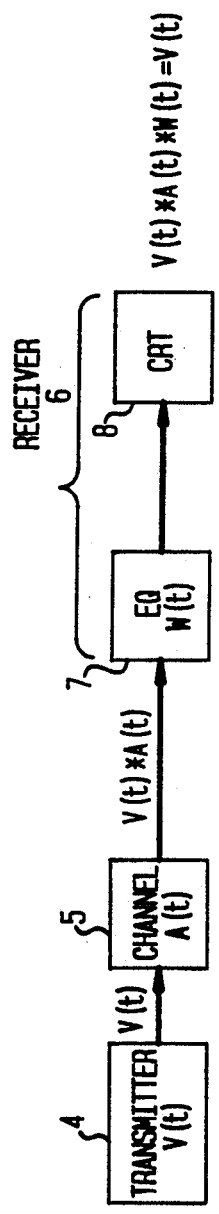
FIG. 2(a) illustrates a video signal transmission path.
FIGS. 2(b),(c) illustrate a prior art ghost cancelling channel equalizer.
Figure 2:
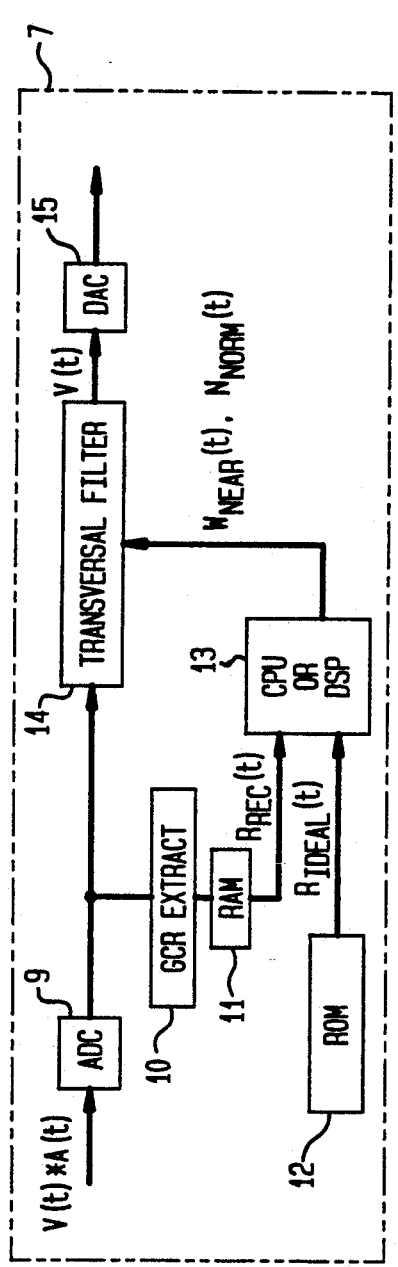
Figure 2:
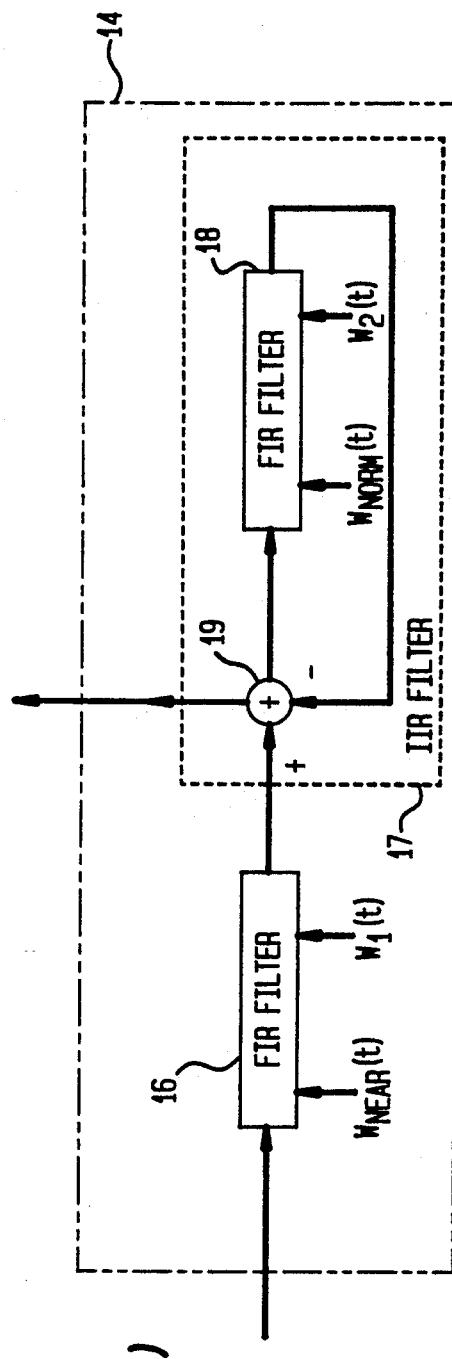
Figure 3:
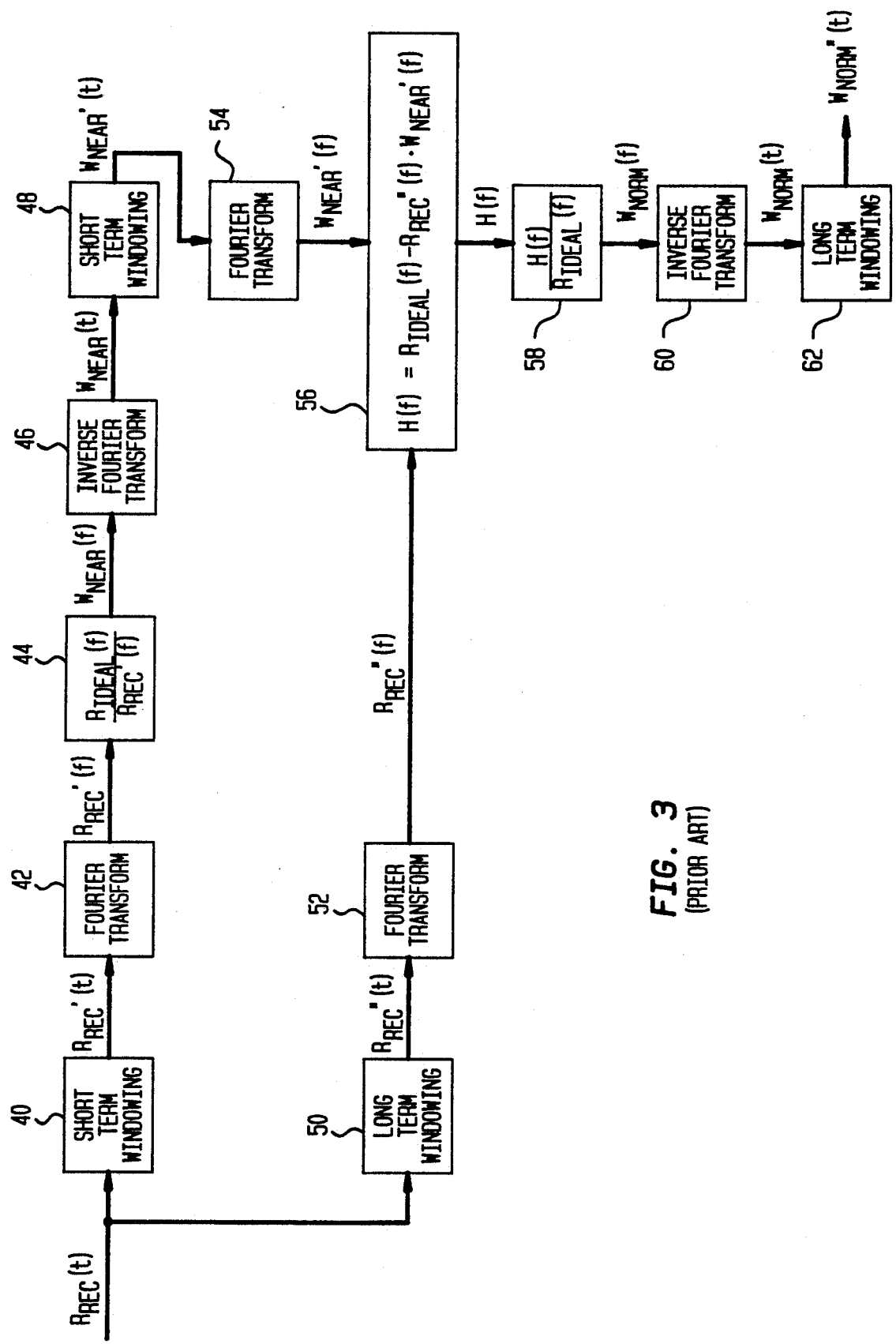
FIG. 3 schematically depicts a prior art division method algorithm.
Figure 4:
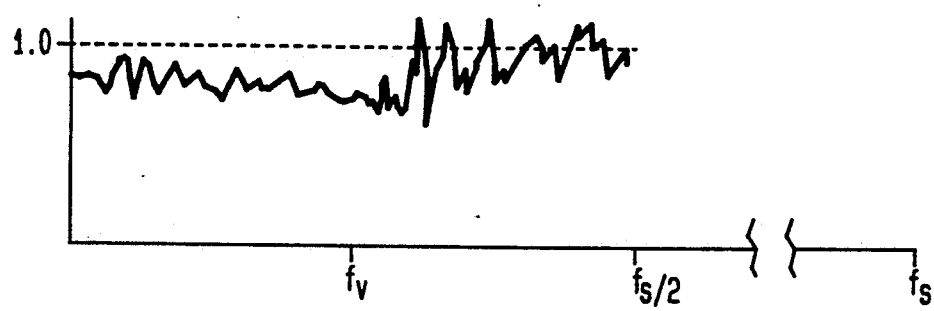
FIG. 4 graphically depicts a tap coefficient signal generated according to the prior art process of FIG. 3 in the frequency domain.
Figure 5:
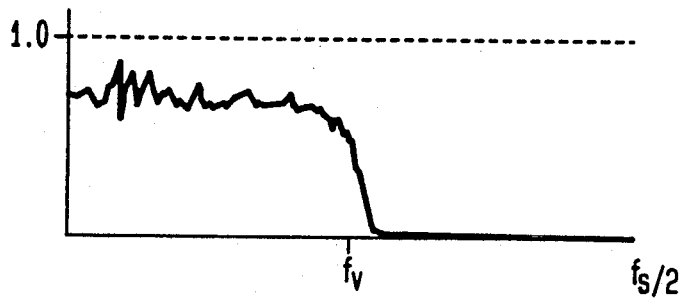
FIG. 5 graphically depicts the signal of FIG. 4 compensated to zero in a particular frequency band.

The ideal and received GCR signals $R_{ideal}(t)$ and $R_{rec}(t)$ are inputted to a CPU or DSP 13 (FIG. 2(b)) which generates both the nearby and normal ghost tap coefficients. To generate nearby ghost taps, the CPU or DSP 13 (FIG. 2(b)) illustratively performs the following steps. A cross-correlation signal $R_{cross}(t)$ is generated by cross-correlating the ideal GCR signal $R_{ideal}(t)$ with the received GCR signal $R_{rec}(t)$ as depicted in step 106. In step 108, the cross-correlation signal $R_{cross}(t)$ is suitably windowed for generating nearby ghost cancellation tap coefficients. Typically, a window size of 3-4 μsec is used. After windowing, the cross-correlation signal is referred to as $R_{cross}'(t)$.

Figure 8:
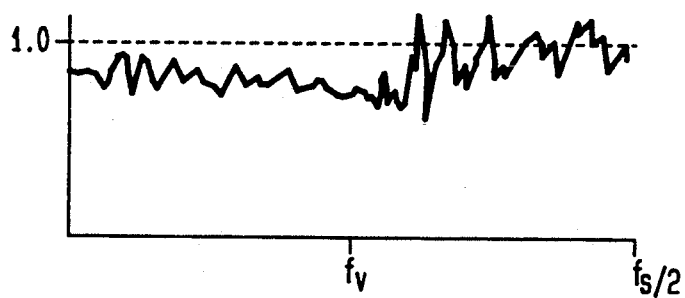
FIG. 8 graphically depicts an unfilled tap coefficient signal generated according to the present invention in the frequency domain.

In step 110, the windowed cross-correlation signal $R_{cross}'(t)$ is converted to the frequency domain. In the frequency domain, the cross-correlation signal is referred to as $R_{cross}'(f)$. $R_{cross}'(f)$ is easily and quickly determined by computing the fast fourier transform of $R_{cross}'(t)$. Then, in step 112, the tap coefficient signal $W_{near}(f)$ is generated according to the formula:

$$W_{near}(f) = \frac{R_{auto}(f)}{R_{cross}'(f)} \quad (6)$$

where $R_{auto}(f)$ is the autocorrelation of the ideal GCR signal $R_{ideal}(t)$, in the frequency domain. Illustratively, the autocorrelation of the ideal GCR signal $R_{auto}(f)$ is predetermined. For example, in step 112 the autocorrelation signal $R_{auto}(f)$ may be retrieved from, or generated by, the circuit 12 (FIG. 2(b)). The resulting tap coefficient signal $W_{near}(f)$ is depicted in FIG. 8. As depicted in FIG. 8, the signal $W_{near}(f)$ has non-zero values between 0 and approximately the upper cutoff frequency $f_v$ of the received video signal $V(t)*A(t)$, which, illustratively, is approximately 4.2 MHz.

Figure 9:
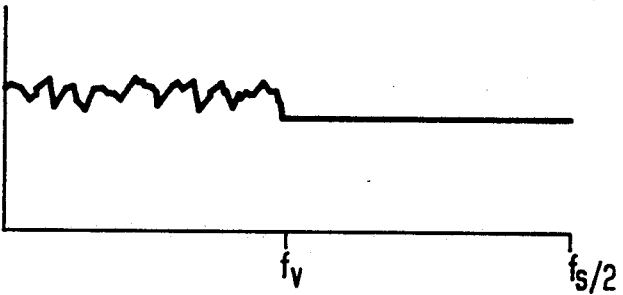
FIG. 9 graphically depicts a filled tap coefficient signal generated according to the present invention in the frequency domain.

Referring again to FIG. 7, in step 114, the band from approximately $f_v$ (4.2 MHz) to $f_{s/2}$ (7.16 MHz) of the tap coefficient signal $W_{near}(f)$ is filled with a constant non-zero value. Preferably, this constant value is the average value of the tap coefficient signal $W_{near}(f)$ in the band from 0 to approximately $f_v$. Such a filled tap coefficient signal $W_{near}(f)$ is depicted in FIG. 9.

Figure 6:
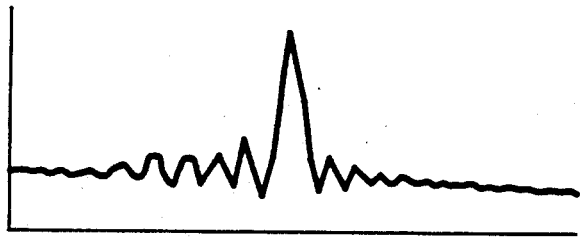
FIG. 6 graphically depicts the signal of FIG. 5 in the time domain.
Figure 10:
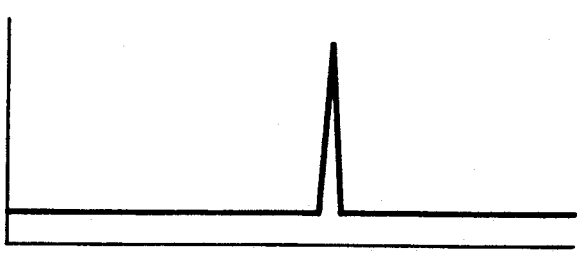
FIG. 10 graphically depicts a filled tap coefficient signal generated according to the present invention in the time domain.

In step 116, the filled tap coefficient signal $W_{near}(f)$ is converted to the time domain by computing its inverse fast fourier transform. The filled tap coefficient signal $W_{near}(t)$ is a vector quantity with, for example, one hundred twenty eight values. Thus, in step 118, the filled tap coefficient signal $W_{near}(t)$ is windowed to produce a number of tap coefficients sufficient for cancelling nearby ghosts. Illustratively, the filled tap coefficient signal $W_{near}(t)$ is windowed for sixty-four tap coefficients. This windowed tap coefficient signal, referred to as $W_{near}'(t)$, is plotted in FIG. 10. In comparison to the tap coefficient signal $W_{near}'(t)$ (FIG. 6) determined according to the prior art method, the signal $W_{near}'(t)$ determined according to the present invention is concentrated over a much narrower interval in the time domain. Because the tap coefficient signal $W_{near}'(t)$ determined according to the present invention is relatively compact, fewer tap coefficients need be obtained in order to cancel adequately a ghost.

The nearby ghost tap coefficients $W_{near}'(t)$ are transferred to the FIR filter 16 (FIG. 2(c)). The FIR filter 16 filters the sampled, received video signal $V(t)*A(t)$ with these coefficients to cancel nearby ghosts.

Figure 11:
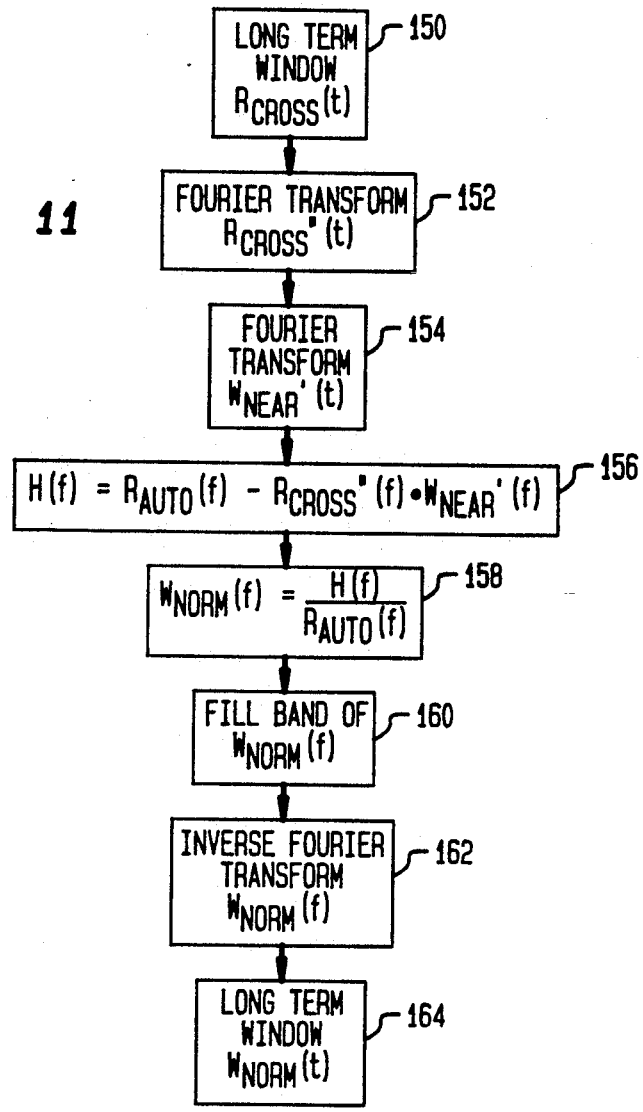
FIG. 11 schematically illustrates a process according to the present invention for generating a normal ghost tap coefficient signal.

Turning now to FIG. 11, a process for dynamically generating tap coefficients for cancelling normal ghosts is depicted. Illustratively, the normal ghost tap coefficients are simultaneously or contemporaneously generated with the nearby ghost tap coefficients in the CPU or DSP 13 (FIG. 2(b)). To determine normal ghost tap coefficients, the CPU or DSP 13 (FIG. 2(b)) illustratively performs the following steps. In step 150, the cross-correlation signal $R_{cross}(t)$ generated in step 106 (FIG. 7) of the process for generating the nearby ghost tap coefficients is suitably windowed for generating normal ghost tap coefficients. Illustratively, a 42 μsec window is used. This windowed cross-correlation signal is referred to as $R_{cross}''(t)$. Next, in step 52 of FIG. 11, the signal $R_{cross}''(t)$ is converted to the frequency domain (to produce $R_{cross}''(f)$). Again, this is illustratively achieved by computing the fast fourier transform of the windowed cross-correlation signal $R_{cross}''(t)$.

In step 154, the nearby ghost tap coefficient signal $W_{near}'(t)$ is converted to the frequency domain. The nearby ghost tap coefficient signal in the frequency domain $W_{near}'(f)$ is illustratively obtained by computing the fast fourier transform of the signal $W_{near}'(t)$ determined in step 118 of FIG. 7.

In step 156, a signal $H(f)$ is computed by the formula:

$$H(f) = R_{auto}(f) - R_{cross}''(f) \cdot W_{near}'(f) \quad (7)$$

Then in step 158, the normal ghost tap coefficient signal $W_{norm}(f)$ is computed by the formula:

$$\frac{H(f)}{R_{auto}(f)} \quad (8)$$

Next, as with the signal $W_{near}(f)$, the band of the normal ghost tap coefficient signal $W_{norm}(f)$, from approximately the upper cutoff frequency of the received video signal $V(t)*A(t)$ (4.2 MHz) $f_v$, to half the sampling frequency (7.16 MHz) $f_{s/2}$, is filled with a constant non-zero value. (Note that $W_{norm}(f)$ is symmetric with respect to $f_{s/2}$). Illustratively, this value is the average value of the band from 0 to approximately $f_v$ (4.2 MHz) of the signal $W_{norm}(f)$ This filled, normal ghost tap coefficient signal $W_{norm}(f)$ is generated in step 160. In step 162, the filled, normal ghost tap coefficient signal $W_{norm}(f)$ is converted to the time domain by computing its inverse fast fourier transform $W_{norm}(t)$. The filled, normal ghost tap coefficient signal $W_{norm}(t)$ is a vector quantity with, for example, one thousand twenty-four values. Thus, in step 164 the filled, normal ghost tap coefficient signal $W_{norm}(t)$ is suitably windowed to produce a number of tap coefficients sufficient for cancelling normal ghosts. Illustratively, the windowed, normal ghost tap coefficient signal $W_{norm}''(t)$ is generated by windowing the filled, normal ghost tap coefficient signal $W_{norm}(t)$ for six hundred tap coefficients.

Illustratively, not all of the six hundred normal ghost tap coefficients are used in the IIR filter 17 (FIG. 2(c)). Rather, the CPU or DSP 13 (FIG. 2(b)) selects a certain number of sequences of tap coefficients where each sequence is used to cancel one normal ghost in the IIR filter 17 (FIG. 2(c)). For example, ten sequences of tap coefficients may be provided, which sequences each comprise eight tap coefficients, for a total of eighty tap coefficients.

Figure 12:
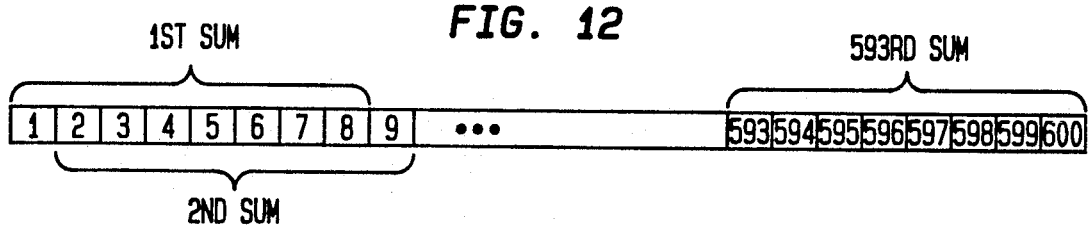
FIG. 12 illustrates a moving sum technique for use with the process illustrated in FIG. 11.

Tap coefficient sequences may illustratively be selected by the CPU or DSP I3 (FIG. 2(b)) in the following manner. First, the CPU or DSP I3 (FIG. 2(b)) forms a moving sum every n tap coefficients, wherein n is the number of taps in each selected array (e.g., n=eight). To that end, sequences of n (e.g., eight) consecutive tap coefficients are added together, where each sequence is a candidate sequence of tap coefficients which may be selected. The first sum is formed by adding together the first through the eighth tap coefficients, the second sum by adding together the second through the ninth tap coefficients, etc. This method of forming sums is depicted in FIG. 12. In all, five hundred ninety-three sums are formed.

Figure 13:
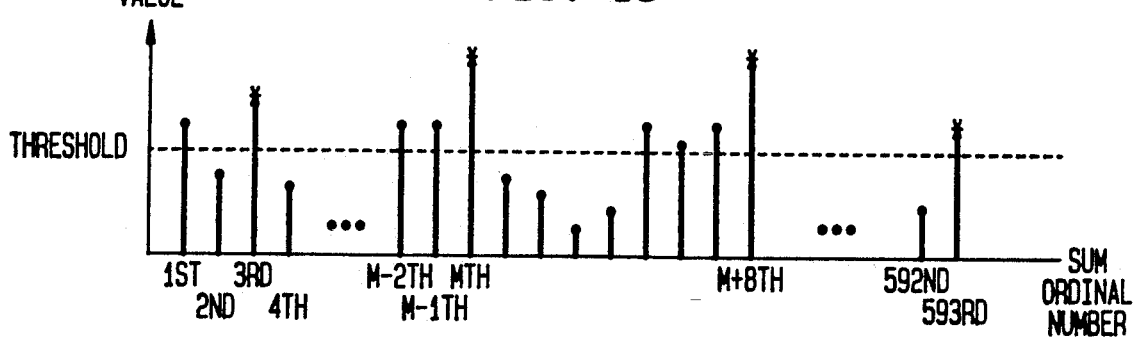
FIG. 13 graphically depicts sums of tap coefficients generated according to the moving sum technique of FIG. 12.

FIG. 13 illustrates a graph of the sums corresponding to each sequence. The CPU or DSP 13 (FIG. 2(b)) selects a predetermined number, e.g, ten, of the sequences where each selected sequence satisfies two criteria. First, the sum of the taps in the selected sequence must exceed some threshold (depicted as a dashed line in FIG 13). Second, no two selected sequences may overlap. As depicted in FIG. 13, the moving average assigns an ordinal number or ordering for each sum, i.e., the first sum is formed by adding taps one through eight, the second sum by adding taps two through nine, etc. If the ordinal number of one sums exceeds the ordinal number of the other sum by at least n (the number of elements in each sequence), then the sequences corresponding to the two sums do not overlap one another. Thus, the second criteria may be satisfied by comparing the ordinal number of each sum corresponding to a candidate sequence of taps.

The selected tap coefficient sequences are transferred to the IIR filter 17 (FIG. 2(c)). Therein, each sequence is used to filter the received video signal $V(t)*A(t)$ to cancel a non-nearby ghost.

In summary, a division method and system for cancelling ghosts is disclosed in which tap coefficients are generated according to the formulas:

$$W_{near}(f) = \frac{R_{auto}(f)}{R_{cross}'(f)}$$

$$H(f) = R_{auto}(f) - R_{cross}''(f) \cdot W_{near}'(f)$$

$$W_{norm}(f) = \frac{H(f)}{R_{auto}(f)}$$

The tap coefficient signals are then filled with a constant non-zero value in a band above the upper cutoff frequency of the received video signal. Tap coefficient signals generated in this manner are concentrated in the time domain. As such, fewer tap coefficients are necessary in order to cancel ghosts.

Finally, the above discussion is intended to be merely illustrative of the invention. Numerous other embodiments may be devised by those having ordinary skill in the art without departing from the spirit or scope of the following claims.

We claim:

1. A video receiver comprising:
    an extraction circuit, receiving a video signal from a multipath channel, for extracting a received ghost cancelling reference (GCR) signal $R_{rec}(t)$ from said received video signal,
    a digital signal processor, receiving said received GCR signal $R_{rec}(t)$ and an ideal GCR signal $R_{ideal}(t)$, for determining nearby ghost tap coefficients $W_{near}(f)$ according to the formula:

$$W_{near}(f) = \frac{R_{auto}(f)}{R_{cross}'(f)}$$

where $R_{auto}(f)$ is the autocorrelation of $R_{ideal}(t)$, in the frequency domain, and $R_{cross}'(f)$ is the cross-correlation of $R_{ideal}(t)$ and $R_{rec}(t)$, windowed for cancelling nearby ghosts, in the frequency domain, said digital signal processor also for correcting $W_{near}(f)$ by inserting a constant, non-zero value in a frequency band of $W_{near}(f)$ above the upper cutoff frequency of said received video signal, and
    a transversal filter, receiving said nearby ghost tap coefficients in the time domain and said received video signal, for filtering said received video signal with said nearby ghost tap coefficients.

2. The video receiver of claim 1 wherein said digital signal processor determines normal ghost tap coefficients $W_{norm}(f)$ according to the formula:

$$W_{norm}(f) = \frac{H(f)}{R_{auto}(f)}$$

where $H(f) = R_{auto}(f) - R_{cross}''(f) \cdot W_{near}'(f)$, $R_{cross}''(f)$ is the cross correlation of $R_{rec}(t)$ and $R_{ideal}(t)$, windowed for cancelling normal ghosts, in the frequency domain, and $W_{near}'(f)$ is the nearby ghost tap coefficient signal, windowed for cancelling nearby ghosts, in the frequency domain, and wherein said digital signal processor corrects said normal tap coefficient signal $W_{norm}(f)$, by inserting a constant, nonzero value in a frequency band above the upper cutoff frequency of said received video signal.

3. The receiver of claim 2 wherein said digital signal processor converts said signal $W_{norm}(f)$ to the time domain to produce $W_{norm}(t)$ and wherein said digital signal processor windows $W_{norm}(t)$ for obtaining normal ghost tap coefficients to produce $W_{norm}''(t)$.

4. The circuit of claim 3 wherein said digital signal processor selects sequences of normal ghost tap coefficients from said signal $W_{norm}''(t)$ by forming a plurality of sums, each of which sums being formed by adding together a sequence of tap coefficients of $W_{norm}''(t)$ of a particular length and selecting a predetermined number of said sequences which are mutually free of overlap and which have a corresponding sum greater than a particular threshold.

5. The receiver of claim 3 wherein said digital signal processor windows $W_{norm}(t)$ for approximately six hundred tap coefficients to produce $W_{norm}''(t)$.

6. The receiver of claim 2 wherein said digital signal processor windows $R_{cross}(t)$ using an approximately 42 µsec window to produce $R_{cross}''(t)$.

7. The receiver of claim 1 wherein said constant non-zero value is the average value in the frequency band of $W_{near}(f)$ between 0 and said upper cutoff frequency of said received video signal.

8. The receiver of claim 1 further comprising an analog to digital converter, connected to an input of said extraction circuit, for sampling said video signal received from said multipath channel.

9. The circuit of claim 8 wherein said band of said signal $W_{near}(f)$ into which said constant non-zero value is inserted includes a band from approximately said upper cutoff frequency to the frequency at which said received video signal is sampled less said upper cutoff frequency.

10. The receiver of claim 1 further comprising a digital to analog converter, connected to an output of said transversal filter, for converting said filtered video signal to analog form.

11. The receiver of claim 1 further comprising a circuit, connected to an input of said digital signal processor, for generating said $R_{ideal}(t)$ signal.

12. The receiver of claim 1 wherein said digital signal processor windows $R_{cross}(t)$ using an approximately 4 µsec window to produce $R_{cross}'(t)$.

13. The receiver of claim 1 wherein said digital signal processor converts $W_{near}(f)$ to the time domain to produce $W_{near}(t)$ and wherein said digital signal processor windows $W_{near}(t)$ for obtaining nearby ghost tap coefficients.

14. The receiver of claim 13 wherein said digital signal processor windows $W_{near}(t)$ for approximately sixty four tap coefficients.

15. The receiver of claim 1 wherein said transversal filter comprises a FIR filter for cancelling nearby ghosts and an IIR filter for cancelling normal ghosts.

16. A communications system comprising
transmitter means for superimposing an ideal ghost cancelling reference (GCR) signal $R_{ideal}(t)$ onto a video signal and for transmitting said video signal through a multipath channel,
extraction means, receiving said video signal from said multipath channel for extracting a received GCR signal $R_{rec}(t)$ from said received video signal,
processing means, receiving said received GCR signal $R_{rec}(t)$ and an ideal GCR signal $R_{ideal}(t)$ for computing a nearby ghost tap coefficient signal $W_{near}(f)$ according to the formula:

$$W_{near}(f) = \frac{R_{auto}(f)}{R_{cross}'(f)}$$

where $R_{auto}(f)$ is the autocorrelation of $R_{ideal}(t)$, in the frequency domain, and $R_{cross}'(f)$ is the cross-correlation of $R_{ideal}(t)$ and $R_{rec}(t)$, windowed for cancelling nearby ghosts, in the frequency domain,
said processing means also for correcting $W_{near}(f)$ by inserting a constant, non-zero value in a frequency band of $W_{near}(f)$ above the upper cutoff frequency of said received video signal, and
transversal filter means, receiving said nearby ghost tap coefficient signal in the time domain, and said received video signal, for filtering said received video signal with said nearby ghost tap coefficient signal.

17. The communication system of claim 16 wherein said transmitter means superimposes said ideal GCR signal $R_{ideal}(t)$ in a vertical blanking interval of said video signal.

18. A process for cancelling ghosts in a video signal received at a receiver from a multipath channel comprising
extracting a received ghost cancelling reference (GCR) signal $R_{rec}(t)$ from a video signal received from a multipath channel in an extraction circuit,
receiving said received GCR signal $R_{rec}(t)$ and an ideal GCR signal $R_{ideal}(t)$ at a signal processor,
using said signal processor, electronically generating tap coefficients according to the formula, $$W_{near}(f) = \frac{R_{auto}(f)}{R_{cross}'(f)}$$

where $R_{auto}(f)$ is the autocorrelation of said ideal GCR signal $R_{ideal}(t)$, in the frequency domain and $R_{cross}'(f)$ is the cross-correlation of $R_{ideal}(t)$ and $R_{rec}(t)$, windowed for cancelling nearby ghosts, in the frequency domain,
using said signal processor, electronically correcting said tap coefficient signal $W_{near}(f)$ by inserting a constant non-zero value in a frequency band of $W_{near}(f)$ above the upper cutoff frequency of said received video signal, and
filtering said receiving video signal with said tap coefficients in a transversal filter.

* * * * *